United States Patent
Adamson et al.

(10) Patent No.: US 9,114,671 B2
(45) Date of Patent: Aug. 25, 2015

(54) TIRE INCLUDING AN ELECTRONIC MEMBER

(75) Inventors: John David Adamson, Greenville, SC (US); Christopher B. Barton, Clemson, SC (US); Charles E. Kelly, Little River, SC (US); Cameron Earl Smith, Greenville, SC (US); Denis Alff, Malauzat (FR); Mickaël Lion, Clermont-Ferrand (FR); Mathieu Tupinier, Chameliéres (FR); Pierre Wiel, Yssac-la-Tourette (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 1602 days.

(21) Appl. No.: 12/080,500

(22) Filed: Apr. 3, 2008

(65) Prior Publication Data

US 2008/0289736 A1 Nov. 27, 2008

(30) Foreign Application Priority Data

Apr. 3, 2007 (FR) ..................... 07 54241

(51) Int. Cl.
  *B60C 23/04* (2006.01)
  *B29D 30/00* (2006.01)
(52) U.S. Cl.
  CPC ........ *B60C 23/0493* (2013.01); *B29D 30/0061* (2013.01); *B29D 2030/0077* (2013.01)
(58) Field of Classification Search
  CPC .. B60C 23/0493; B60C 23/064; B60C 23/20; B60C 2019/004; B29D 2030/0077
  USPC ..................................................... 152/152.1
  See application file for complete search history.

(56) References Cited

U.S. PATENT DOCUMENTS

| 4,911,217 | A | 3/1990 | Dunn et al. |
| 5,181,975 | A | 1/1993 | Pollack et al. |
| 5,348,067 | A | 9/1994 | Myatt |
| 7,009,576 | B2 * | 3/2006 | Adamson et al. ...... 152/152.1 X |
| 2002/0093422 | A1 | 7/2002 | Shimura |
| 2004/0140030 | A1 | 7/2004 | Hahn et al. |

(Continued)

FOREIGN PATENT DOCUMENTS

| EP | 0 389 406 | 9/1990 |
| EP | 0 505 905 | 9/1992 |
| EP | 0 537 607 | 4/1993 |
| EP | 1 223 056 | 7/2002 |

(Continued)

OTHER PUBLICATIONS

Preliminary Search Report dated Oct. 22, 2007 issued for the counterpart French Application No. 0754241 (4 pages).

*Primary Examiner* — Adrienne C Johnstone
(74) *Attorney, Agent, or Firm* — Cozen O'Connor

(57) ABSTRACT

A tire is disclosed that includes at least one annular bead wire forming a body of revolution about a reference axis. A carcass ply of generally toroidal shape about the same axis as the bead wire has a portion that is folded around the wire. A materials interface is defined at least in part by the junction between a rubber first mass and a second mass that includes an electronic member. By way of example, the electronic member is a passive radiofrequency identification transponder. The interface extends from a free edge of the folded portion of the carcass ply radially away from the reference axis to a circumferential junction line between the interface and the carcass ply.

11 Claims, 1 Drawing Sheet

(56) References Cited

U.S. PATENT DOCUMENTS

2004/0159383 A1* 8/2004 Adamson et al. .......... 152/152.1
2006/0016534 A1 1/2006 Peyron et al.

FOREIGN PATENT DOCUMENTS

| EP | 1 439 079 | 7/2004 |
| WO | WO 2004/065140 | 8/2004 |

* cited by examiner

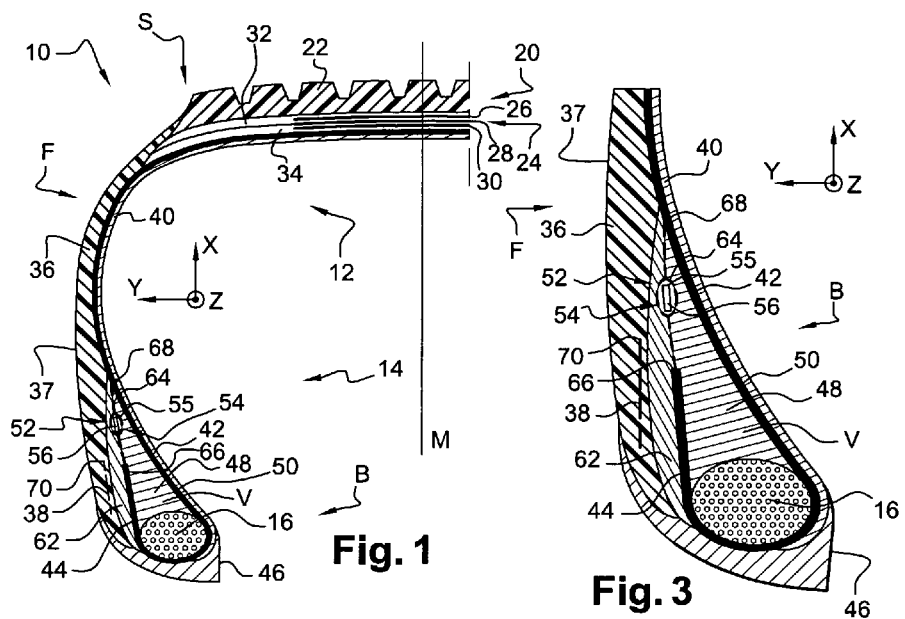
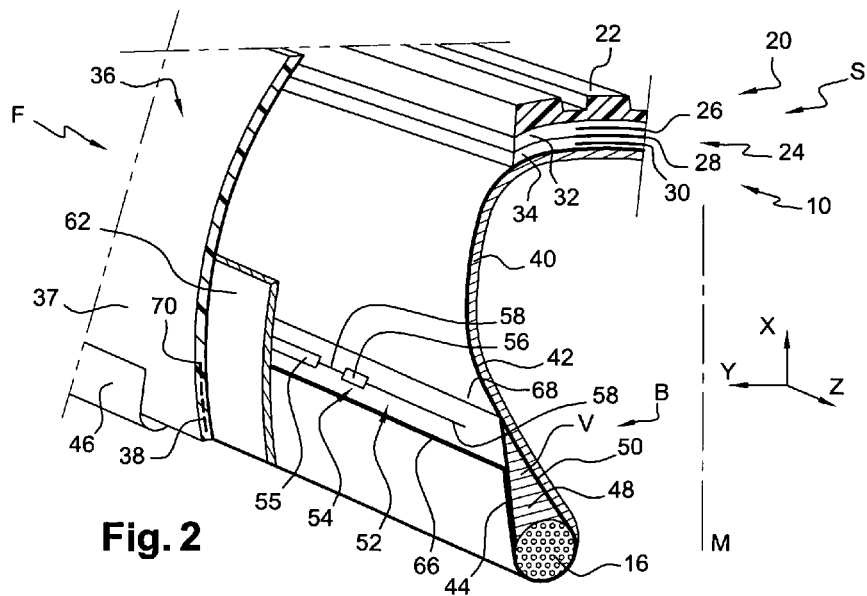

TIRE INCLUDING AN ELECTRONIC MEMBER

RELATED APPLICATION

This application claims the priority of French patent application Ser. No. 07/54241 filed Apr. 3, 2008, the disclosure content of which is hereby incorporated by reference.

FIELD OF THE INVENTION

The present invention relates to a tire including an electronic member, and to a method of fabricating such a tire.

BACKGROUND OF THE INVENTION

The invention applies particularly, but not exclusively, to a tire for a motor vehicle of the heavy goods vehicle (HGV) or truck type. A tire for a truck type vehicle generally comprises a carcass ply provided with metal reinforcing wires, unlike a tire for a private car which generally has its carcass ply reinforced with a non-metallic material, e.g. rayon, nylon, or polyester.

The axial, radial, and circumferential directions of a tire are defined relative to the axis of revolution of the tire.

A tire that includes an electronic member is already known in the state of the art, in particular from EP 0 389 406. In that document, the electronic member comprises a passive radiofrequency identification transponder having two antennas forming a dipole. That type of transponder is generally referred to by the abbreviation RFID. Such a member can store data, e.g. data relating to the fabrication of the tire.

The tire described in EP 0 389 406, and in particular shown in FIG. 2 of that document, comprises an annular bead wire forming a body of revolution about an axis that coincides substantially with the axis of revolution of the tire, and a carcass ply of generally toroidal shape about the same axis as the bead wire, and including a portion that is folded around that wire.

The transponder is positioned in the mass of the tire so that it creates a materials interface within the tire, specifically an interface defined by the junction between at least a rubber first mass and a second mass formed by the transponder.

In EP 0 389 406, a portion of the transponder, and in particular one of its antennas, extends inside the volume lying between the folded portion of the carcass ply and a portion of said carcass ply that faces the folded portion axially.

It is found that positioning the transponder in the manner proposed in EP 0 389 406 is not optimal for radio frequency transmission of the data stored in the transponder, because of the proximity of masses of metal with which it interacts, and in particular the metal wires within the carcass ply.

OBJECTS AND SUMMARY OF THE INVENTION

One object of the invention is to optimize the position of an electronic member, such as a transponder, in the mass of the tire so as to optimize the transmission of data stored in the transponder, and to do so without modifying the main fabrication steps for making the tire, and without modifying the architecture of the tire.

To this end, one aspect of the invention is directed to a tire comprising:
 at least one annular bead wire forming a body of revolution about a reference axis;
 a carcass ply of generally toroidal shape, about the same axis as the bead wire, and including a portion folded around the wire; and
 a materials interface defined at least in part by the junction between a rubber first mass and a second mass including an electronic member;
wherein the interface extends from a free edge of the folded portion of the carcass ply radially away from the reference axis to a circumferential junction line between the interface and the carcass ply.

The position of the electronic member in accordance with an embodiment of the invention enables data recorded in the electronic member to be transmitted in optimum manner. In particular, this position serves to avoid having a portion of the electronic member extending in the volume that exists between the folded portion and the portion of the carcass ply that faces it axially. Thus, the metal masses, and more particularly the wires of the carcass ply cause little disturbance to the transmission of data recorded in the electronic member.

Furthermore, three zones are generally to be distinguished in a tire: a crown that is to form substantially the portion of the tire that comes into contact with the ground; beads, for forming the radially inner portions of the tire and serving in particular to anchor the tire on a wheel rim; and sidewalls interconnecting the beads and the crown. The interface defined in accordance with the invention is situated in one of the beads of the tire. The high stiffness of the beads compared with the sidewalls limits the extent to which they deform while the tire is running on the ground. This deformation, and in particular the deformation in the proximity of the electronic member therefore gives rise to stresses in the vicinity of the interface that are at low levels and that do not harm the mechanical endurance of the tire or the integrity of the electronic member.

Finally, the electronic member is protected against external stresses. The second mass is protected by a thickness of rubber that serves to damp any external stresses such as an impact or the tire rubbing against a sidewalk.

Advantageously, the electronic member is radially offset away from the free edge of the folded portion by at least 10 millimeters (mm), preferably by at least 15 mm.

Offsetting the electronic member from the free edge serves to preserve the mechanical endurance of the tire. The free edge of the carcass ply forms a singularity in the structure of the tire by virtue of its rigid metal nature. Any radial singularity in the structure of a tire forms a zone that is critical for the mechanical endurance of the tire. Thus, offsetting the electronic member away from the free edge avoids amplifying such a singularity and makes it possible to obtain good mechanical endurance for the tire.

Advantageously, for the tire having an annular metal reinforcing ply radially interposed between the reference axis and the electronic member, said electronic member is offset away from a radially outer edge of the reinforcing ply by at least 10 mm, preferably at least 15 mm.

The radially outer edge of the reinforcing ply also forms a structural singularity in the tire. The advantages imparted by offsetting the electronic member away from this edge of the reinforcing ply are therefore similar to those relating to offsetting it away from the free edge of the carcass ply.

Preferably, the interface is also defined by the junction between the rubber first mass and a rubber third mass, the second mass being axially interposed locally between the rubber first and third masses.

Where appropriate, the first mass is a mass for filling a volume that extends between the folded portion of the carcass ply and a portion of said carcass ply axially facing said folded portion.

Preferably, the rubber third mass is a filler mass, covering at least in part, the folded portion of the carcass ply, being locally separated from the first mass by said folded portion.

In general, a materials interface between various rubber masses also forms a critical zone. Thus, while the tire is running, each of the rubber masses defining the interface where they meet is subjected to deformation that can give rise to particular stresses at the interface that become greater with greater differences between the natures of those rubbers. These differences give rise to shear forces at the interface, which is why the interface between different masses of rubber is critical.

When the interface is defined by the junction between rubber masses having natures that are similar if not identical, as is usually the case for the rubber first and third masses used for filling purposes, the mechanical endurance of the tire is not degraded. The deformations of each of the rubber masses are substantially similar. Consequently, the differences in deformation between the rubber masses are small. Thus, although the interface forms a critical zone, when it is defined in accordance with the invention it does not deteriorate the mechanical endurance of the tire.

According to an optional characteristic of the tire of the invention, the electronic member is generally elongate in shape along a direction that is substantially circumferential.

The electronic member thus enables the data it stores to be transmitted in optimized manner. In particular, it should be observed that since the electronic member is elongate in a substantially circumferential direction, all portions of the electronic member are at a substantially constant distance, both axially and radially, from the annular bead wire and from any metal-containing ply, in particular the carcass ply and the reinforcing ply.

According to another optional characteristic of the tire of the invention, the second mass includes a coating rubber mass coating the electronic member.

Preferably, the extension modulus of the rubber of the coating rubber mass is similar to the extension modulus of at least one of the rubbers of the first and third masses.

The term "similar" is used to mean that the difference between the moduluses is less than 10%, and the term "extension modulus" is used to mean a modulus obtained by applying stress to obtain extension of 10% along a single axis after an accommodation cycle and at a temperature of 22° C.

Advantageously, the relative dielectric constant of the rubber of the coating rubber mass is less than the relative dielectric constant of at least one of the rubbers of the first and third masses.

By using such a coating rubber, the transmission of data stored by the electronic member is improved. Generally, it is found that the higher the dielectric constant of the mass of rubber coating the electronic member, the greater the extent to which the electrical signal received and transmitted by the electronic member is attenuated. Since the dielectric constants of the first and third masses of rubber are high, generally greater than 10 in the ultra high frequency (UHF) range (above 300 megahertz (MHz)), data transmission is greatly improved when the relative dielectric constant of the rubber of the coating mass is less than the relative dielectric constants of the rubbers of the first and third masses in the frequency range used. Preferably, the dielectric constant of the coating rubber mass is less than 3 in the UHF frequency range.

Preferably, the coating rubber mass is of limited length in the circumferential direction, exceeding the length of the electronic member in the circumferential direction by only a few millimeters at each of its ends. The term "a few" millimeters is used to mean about two or three millimeters.

Preferably, the electronic member comprises a passive radiofrequency identification transponder provided with two antennas forming a dipole.

Another aspect of the invention is directed to a method of fabricating a tire including an electronic member, comprising the steps of:
  fabricating a cylindrical blank including an annular bead wire interposed between an annular carcass ply and a rubber first mass; and
  folding a portion of the carcass ply around the wire onto the rubber first mass so as to leave a surface of said first mass free;
  wherein the electronic member is positioned on the surface of the rubber first mass that is left free when the carcass ply is folded onto the first mass.

Such a method makes it possible to fabricate a tire that includes an electronic member while modifying neither the order of the steps in a method of fabricating a tire that does not include an electronic member, nor the structure of such a tire.

BRIEF DESCRIPTION OF THE DRAWINGS

The invention can be better understood on reading the following description given purely by way of non-limiting example and made with reference to the drawings, in which:

FIG. 1 is a radial section view of a portion of a tire in accordance with an embodiment of the invention;

FIG. 2 is a partially cut away perspective view of the FIG. 1 tire portion; and

FIG. 3 is a view showing a detail of FIG. 1.

In the figures, three mutually orthogonal axes X, Y, and Z are shown that correspond to the usual radial (X), axial (Y), and circumferential (Z) directions of a tire.

DETAILED DESCRIPTION OF THE DRAWINGS

In FIGS. 1 and 2, there can be seen a tire of the invention designated by overall reference 10. Specifically, the tire 10 is designed to be mounted on a wheel of a motor vehicle of the heavy goods vehicle (HGV) or truck type.

In conventional manner, the tire 10 comprises a crown S extended by two sidewalls F and two beads B. Only one sidewall F and one bead B are shown in the figures.

Two bead wires 16 (only one is shown) are embedded in the beads B. The two wires 16 are arranged symmetrically about a radial midplane M of the tire.

Each wire 16 forms a body of revolution about a reference axis. This reference axis is substantially parallel to the direction Y and substantially coincides with an axis of revolution of the tire.

The crown S comprises both a tread 20 with a tread design 22, and reinforcement 24. The reinforcement 24 comprises metal plies 26, 28, and 30 embedded in rubber masses 32 and 34.

A mass of rubber 36 extends radially from the crown to the level of the wire 16 of the bead B, defining an outside surface 37 of the sidewall F and of the bead B.

In addition, in the example described, the bead B includes an annular ply 38 constituted by metal reinforcement, which ply is inclined relative to the circumferential direction.

The tire 10 also has an airtight rubber inner liner ply 40 and a casing or carcass ply 42. These plies 40 and 42 are generally toroidal in shape, both about the axis of the bead wires 16. The plies 40 and 42 extend between the two annular bead wires 16 of the tire 10, passing via the crown S.

In the bead B of the tire 10, the carcass ply 42 has a portion 44 folded around the wire 16. The bead B also comprises an annular mass of protective rubber 46 serving in part to anchor the tire 10 radially and axially on a rim.

The bead B of the tire 10 also has a rubber first mass 48 for filling a volume V extending between the folded portion 44 of the carcass ply 42 and a portion 50 of the carcass 42 that faces the folded portion 44 axially.

The bead B of the tire 10 also includes, at least in the example shown in FIGS. 1 to 3, a second mass 52 containing an electronic member 54 optionally coated in a mass of rubber 55. The electronic member 54 is preferably generally elongate in shape in a direction that is substantially circumferential (parallel to Z axis). Specifically, the member 54 comprises a passive radiofrequency identification (RFID) transponder 56 provided with two antennas 58 forming a dipole.

As shown in the figures, the bead B also has a rubber third mass 62. This third mass 62 forms a filler mass covering the folded portion 44 of the carcass ply 42, at least in part. The third mass 62 is separated locally from the first mass 48 by the folded portion 44. As shown in FIGS. 1 and 1, the third rubber mass 62 has no contact with the surface of the tire.

The junction between the first mass 48 and the second mass 52 containing the electronic member 54 defines at least part of a materials interface 64 that is represented by dashed lines in FIGS. 1 and 3. This interface 64 is also defined by the junction between the first mass 48 and the third mass 62.

In this manner, and as shown in the figures, the second mass 52 is axially interposed locally between the rubber first and third masses 48 and 52.

The interface 64 extends radially from the reference axis from a free edge 66 of the folded portion 44 of the carcass ply 42 as far as a circumferential junction line 68 between the interface 64 and the carcass ply 42.

As shown in the figures, the electronic member 54 is radially offset away from the free edge 66 of the folded portion 44 by at least 10 mm. Preferably, the electronic member 44 is radially offset by at least 15 mm away from the free edge 66 of the folded portion 44.

Since the annular metal reinforcing ply 38 is radially interposed between the reference axis and the electronic member 54 and since it is axially outside the interface in question, the electronic member 54 is offset away from a radially outer edge 70 of the reinforcing ply 38 by at least 10 mm, and preferably by at least 15 mm.

Furthermore, the extension modulus of the rubber constituting the coating rubber mass 55 in the example shown in the figures is similar to the extension modulus of at least one of the rubbers of the first and third masses 48 and 62.

Also, the relative dielectric constant of the rubber of the coating rubber mass 55 is less than the relative dielectric constant of at least one of the rubbers of the first and third masses 48 and 62.

In addition, the coating rubber mass 55 is of length in the circumferential direction that is limited, not exceeding the length of the electronic member 54 in the circumferential direction by more than a few millimeters at each of its ends.

The main aspects of the method of fabricating a tire 10 in accordance with an embodiment of the invention are described below.

A raw blank of generally cylindrical shape is initially fabricated that, on being vulcanized, will constitute the tire 10.

In the description of the method, it should be observed that the references used above to specify the various vulcanized rubber masses are also used to specify the corresponding rubber masses prior to being vulcanized.

Usually, to fabricate the blank, the carcass ply 42 is put into place, and then the bead wires 16 and the first masses 48 are put into place on the carcass ply 42. The ends 44 are then turned over so as to cover the two wires and portions of the first masses 48, thus leaving a free surface.

A first variant consists in depositing the second mass 52 on the free surface of the first mass 48.

In a second variant, the second mass 52 is deposited on the surface of the first mass 48 that is going to remain free before said mass 48 is itself placed on the carcass ply 42.

Finally, the blank (whatever its variant) has the other masses of rubber and the other masses of metal placed thereon in application of steps that are conventional in the fabrication of a tire 10. In the example described, the rubber third mass 62, the rubber mass 36 for defining the outside surface of the sidewalls and of the beads, the protective rubber mass 46, the metal plies 26, 28, and 30, and the rubber masses 32 and 34, in particular, are put into place.

What is claimed is:

1. A tire comprising:
   at least one annular bead wire forming a body of revolution about a reference axis;
   a carcass ply of generally toroidal shape comprising metallic wires, about the same axis as the bead wire, and including a portion folded around the wire; and
   a materials interface defined by a junction between a rubber first mass extending partially between the folded portion of the carcass ply and the portion of said carcass ply axially facing said folded portion and a rubber third mass covering at least in part, the axially outer part of the folded portion of the carcass ply and being locally separated from the first mass by said folded portion,
   said materials interface between the first and the third mass extending from a free edge of the folded portion of the carcass ply radially away from the reference axis to a circumferential junction line between the interface and the carcass ply, and
   wherein a second mass including an electronic member having an elongated shape extending circumferentially is locally axially interposed on said materials interface between the rubber first and third masses so that all portions of the electronic member are located at a constant distance, both axially and radially, from the annular bead wire and from any metal containing ply.

2. The tire according to claim 1, in which the electronic member is radially offset away from the free edge of the folded portion by at least 10 mm.

3. The tire according to claim 2, in which the electronic member is radially offset away from the free edge of the folded portion by at least 15 mm.

4. The tire according to claim 1, in which, for the tire having an additional annular metal reinforcing ply radially interposed between the reference axis and the electronic member, said electronic member is offset away from a radially outer edge of the additional reinforcing ply by at least 10 mm.

5. The tire according to claim 4, in which, for the tire having an additional annular metal reinforcing ply radially interposed between the reference axis and the electronic member, said electronic member is offset away from a radially outer edge of the reinforcing ply by at least 15 mm.

6. The tire according to claim 1, in which the rubber third mass is a filler mass, having no contact with the surface of the tire.

7. The tire according to claim 1, in which the second mass includes a coating rubber mass coating the electronic member.

8. The tire according to claim 7, in which the coating rubber mass is of limited length in the circumferential direction, exceeding the length of the electronic member in the circumferential direction by only about two or three millimeters at each of its ends.

9. The tire according to claim 1, in which the second mass includes a coating rubber mass coating the electronic member, and in which the difference between the modulus at 10% extension of the rubber of the coating rubber mass and that of at least one of the rubbers of the first and third masses is less that 10%.

10. The tire according to claim 1, in which the second mass includes a coating rubber mass coating the electronic member, and in which the relative dielectric constant of the rubber of the coating rubber mass is less than the relative dielectric constant of at least one of the rubbers of the first and third masses.

11. The tire according to claim 1, in which the electronic member comprises a passive radiofrequency identification transponder provided with two antennas forming a dipole.

\* \* \* \* \*